July 24, 1956  F. R. HAUBER ET AL  2,755,632
SUBMARINE BURYING APPARATUS
Filed March 14, 1952  12 Sheets-Sheet 1
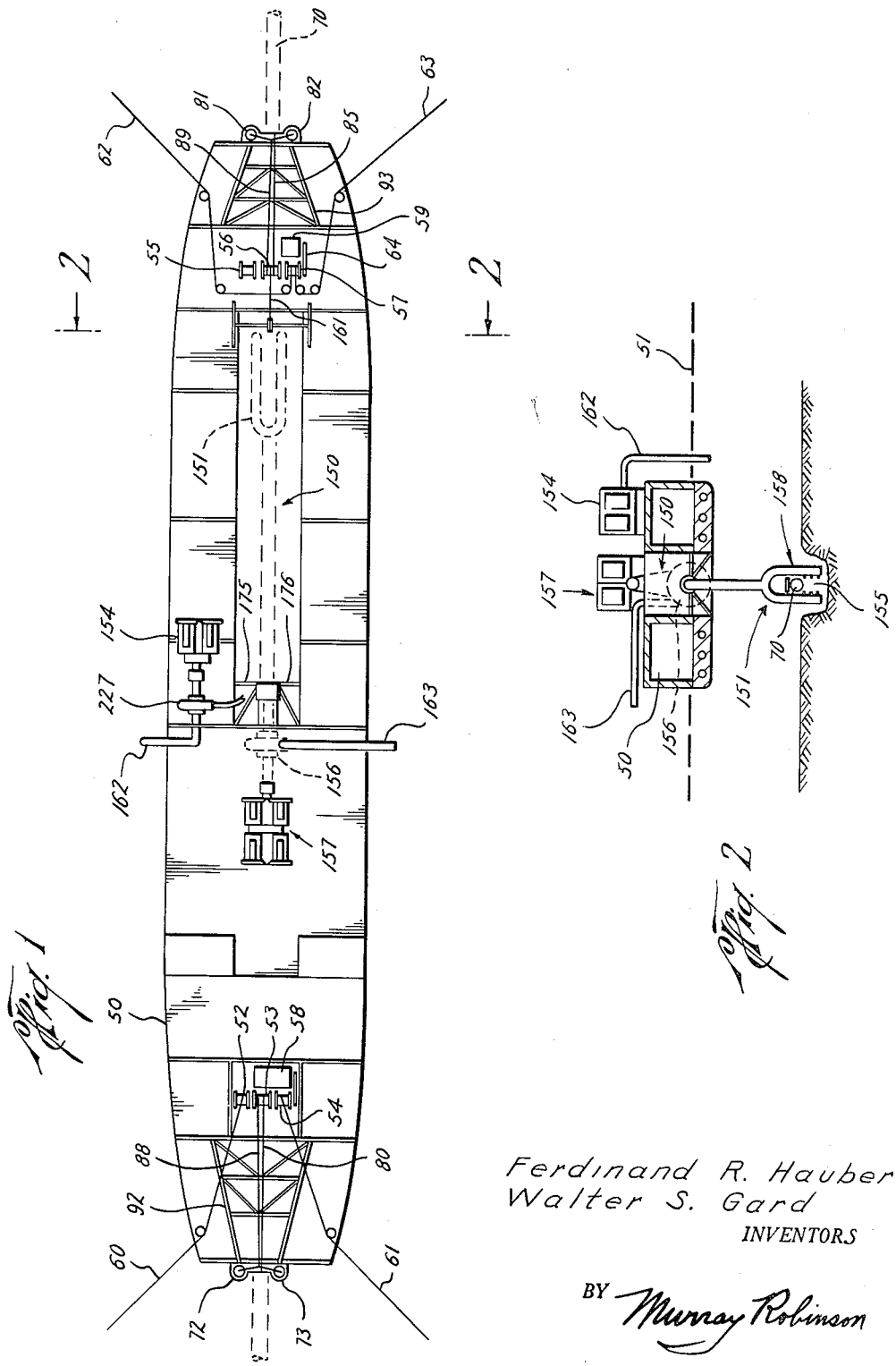
Ferdinand R. Hauber
Walter S. Gard
INVENTORS
BY Murray Robinson
ATTORNEY

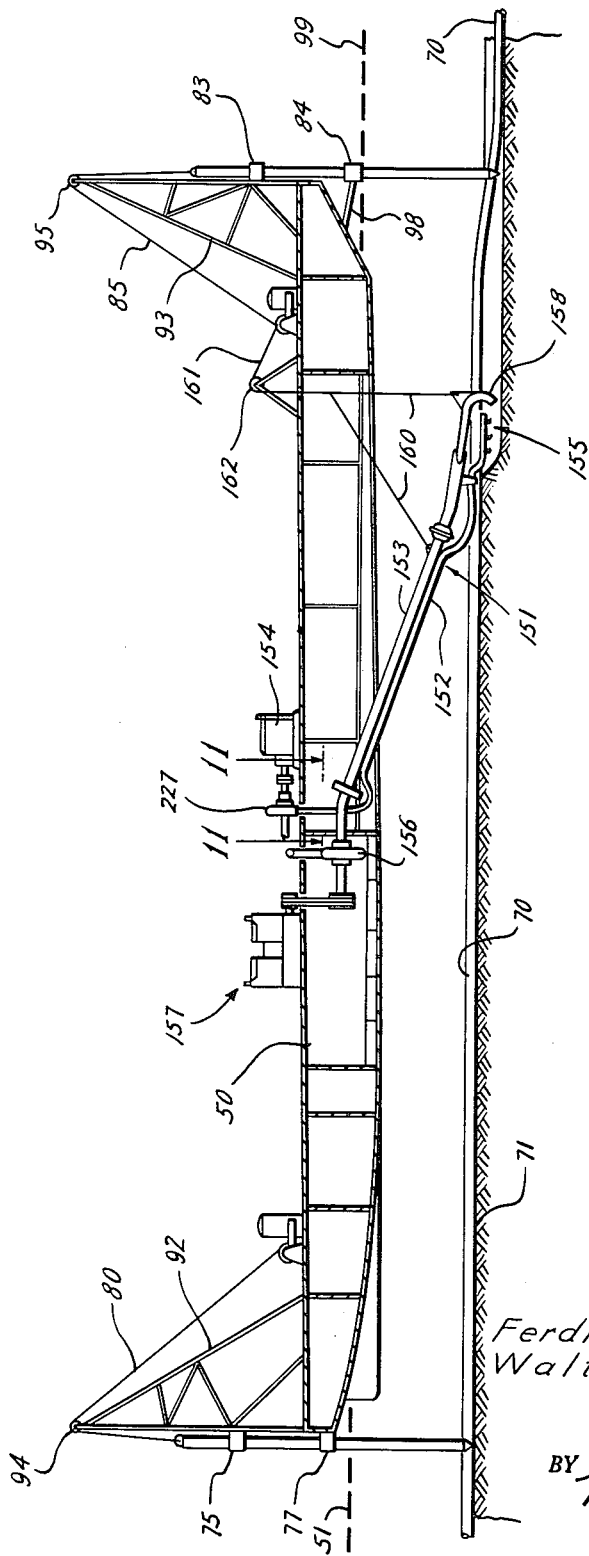

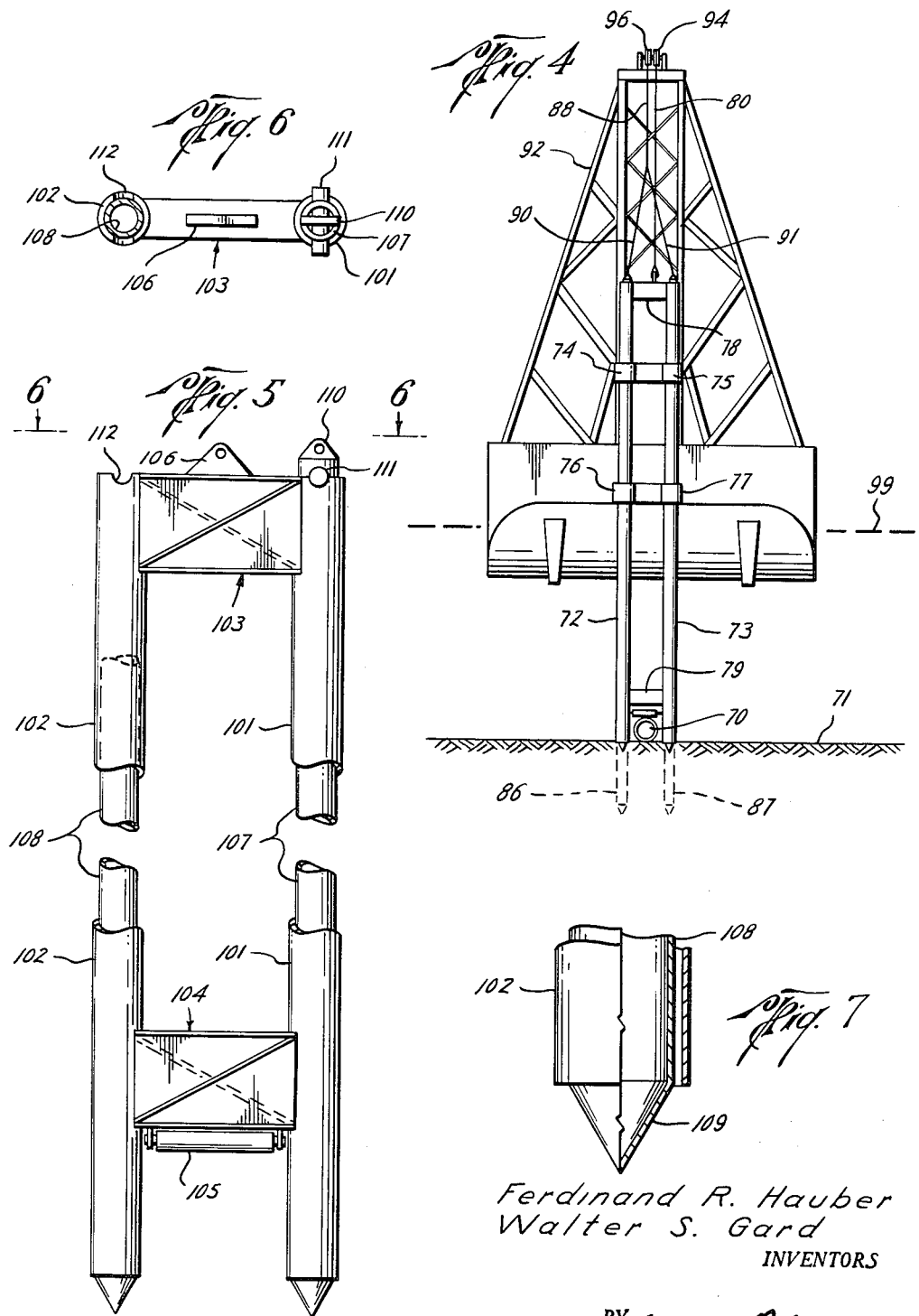

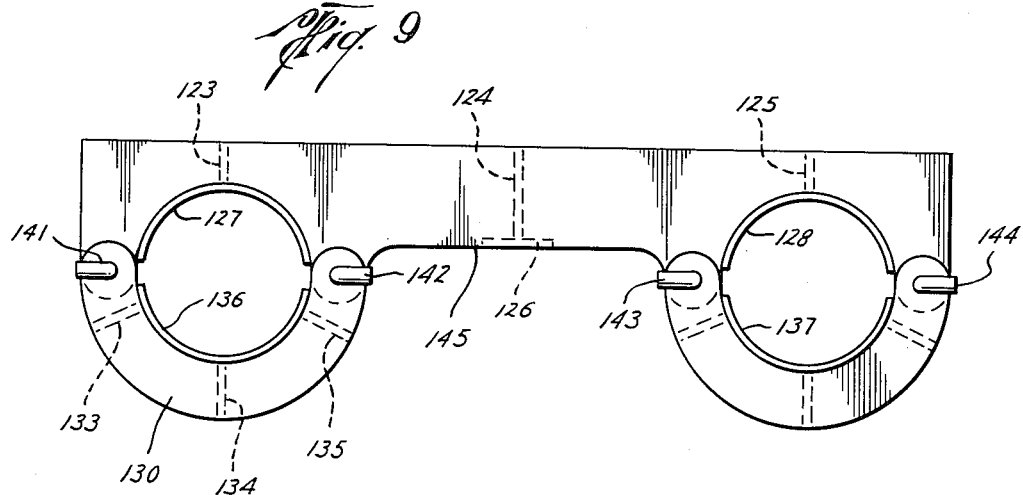
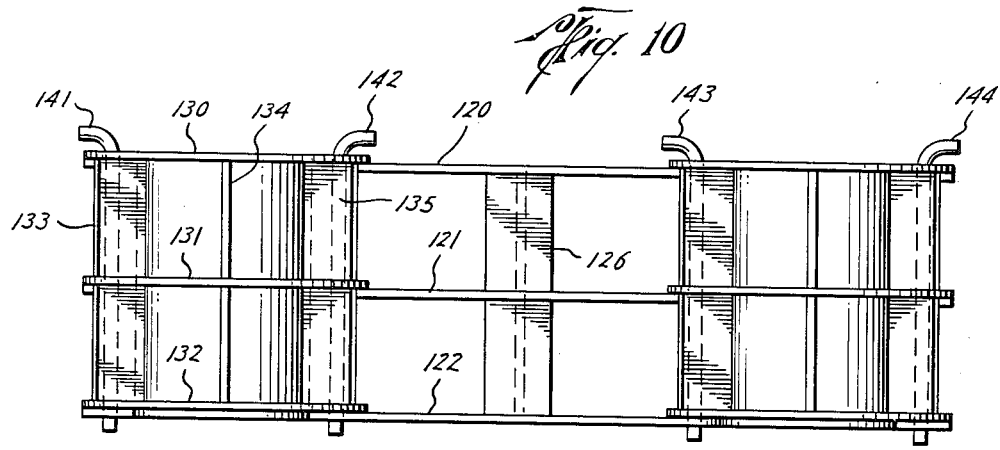
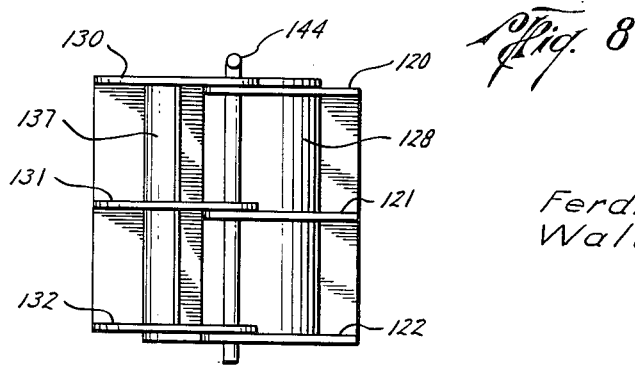

July 24, 1956  F. R. HAUBER ET AL  2,755,632
SUBMARINE BURYING APPARATUS
Filed March 14, 1952  12 Sheets-Sheet 5

Ferdinand R. Hauber
Walter S. Gard
INVENTORS

BY Murray Robinson
ATTORNEY

Ferdinand R. Hauber
Walter S. Gard
INVENTORS

BY Murray Robinson
ATTORNEY

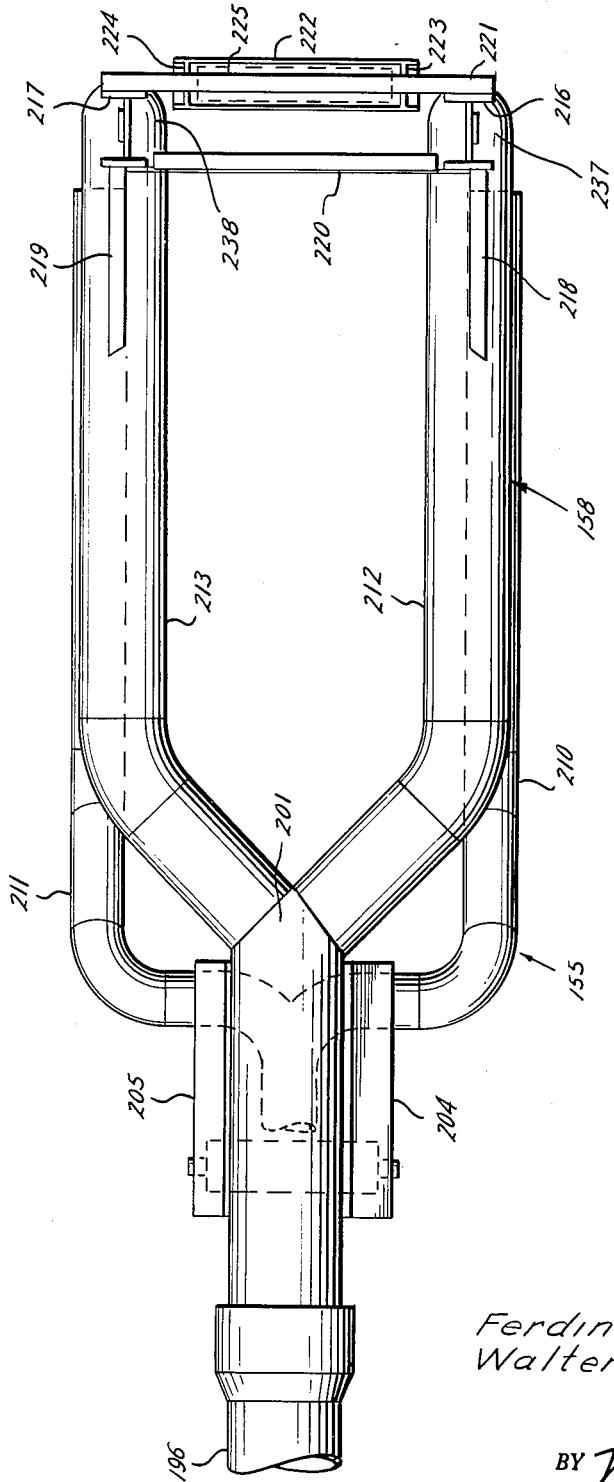

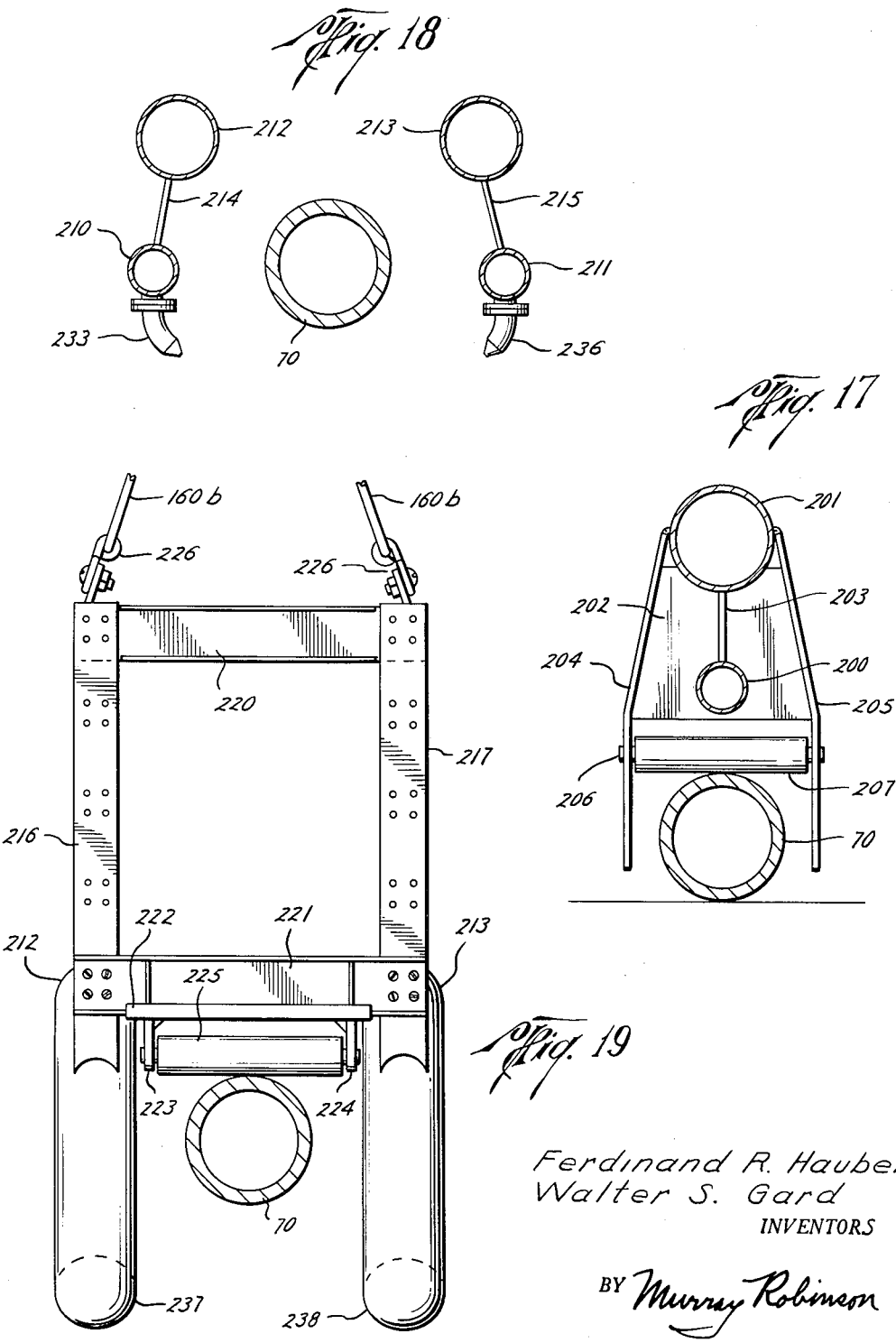

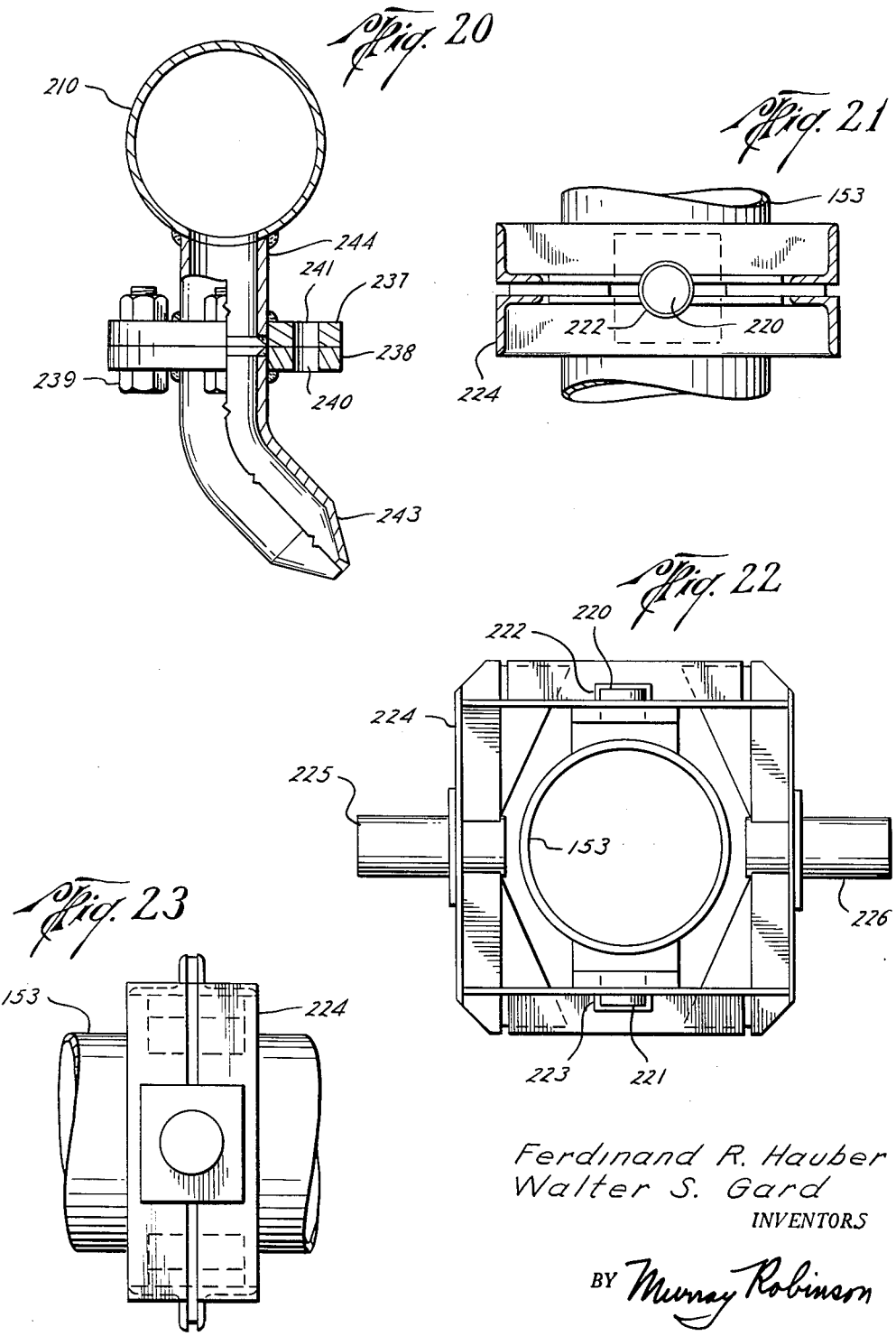

United States Patent Office 2,755,632
Patented July 24, 1956

2,755,632

SUBMARINE BURYING APPARATUS

Ferdinand R. Hauber, Galena Park, and Walter S. Gard, West University Place, Tex., assignors to Brown & Root, Inc., Houston, Tex., a corporation of Texas Application March 14, 1952, Serial No. 276,646

9 Claims. (Cl. 61—72)

This invention pertains to burying apparatus and more particularly to apparatus for digging a trench or ditch directly under a previously laid underwater pipe line to cause the pipe line to fall into the trench where it can be easily covered by either the exhaust from the apparatus or by natural movements of the underwater surface. Although the invention is particularly intended for use in burying a pipe line and will be described in connection with apparatus therefor, it is also applicable to the burying of a cable or other line, that is, a member of considerable length and of fairly uniform cross-sectional area. Furthermore, the invention may be applied in burying a line not only at the bottom of an ocean or other body of salt water but also in the beds of lakes and rivers and generally in any marine floor, that is, the surface of the earth's crust at the bottom of a body of water.

It is the principal object of the invention to provide such an apparatus which will be able to bury a line more consistently than has heretofore been possible.

A further object of the invention is to provide such an apparatus which will bury a line at a greater depth than has heretofore been possible.

Another object of the invention is to provide such an apparatus which will bury the line with less movement and disturbance and stress of the line.

A further object of the invention is to provide such an apparatus which will bury the line without injury to the surface thereof or any covering thereon.

Other objects and advantages of the invention will become apparent from the following description of a preferred embodiment thereof, reference being had to the accompanying drawings wherein:

Figure 1 is a plan view of an apparatus embodying the invention;

Figure 2 is a vertical section taken at line 2—2 of Figure 1;

Figure 3 is a vertical section through the longitudinal axis of the apparatus shown in Figure 1;

Figure 4 is an elevation of the leading end of the apparatus, that is, the left end as viewed in Figure 1;

Figure 5 is an elevation showing one of the guide-spud assemblies;

Figure 6 is a top view thereof;

Figure 7 is a quarter section of the lower part of one guide pipe and spud;

Figure 8 is a side view of one of the gate assemblies;

Figure 9 is a plan view thereof;

Figure 10 is an elevation thereof;

Figure 16 is a plan view of the jet and suction headers;

Figure 17 is a section taken on the line 17—17 of Figure 14;

Figure 18 is a section taken on the line 18—18 of Figure 14;

Figure 19 is a section taken on the line 19—19 of Figure 14;

Figure 20 is a section similar to Figure 18 showing one of the jet nozzles to a larger scale;

Figure 21 is a plan view of the gimbals for supporting the suction flow line;

Figure 22 is an end view thereof; and

Figure 23 is a side elevation thereof.

Figure 11:
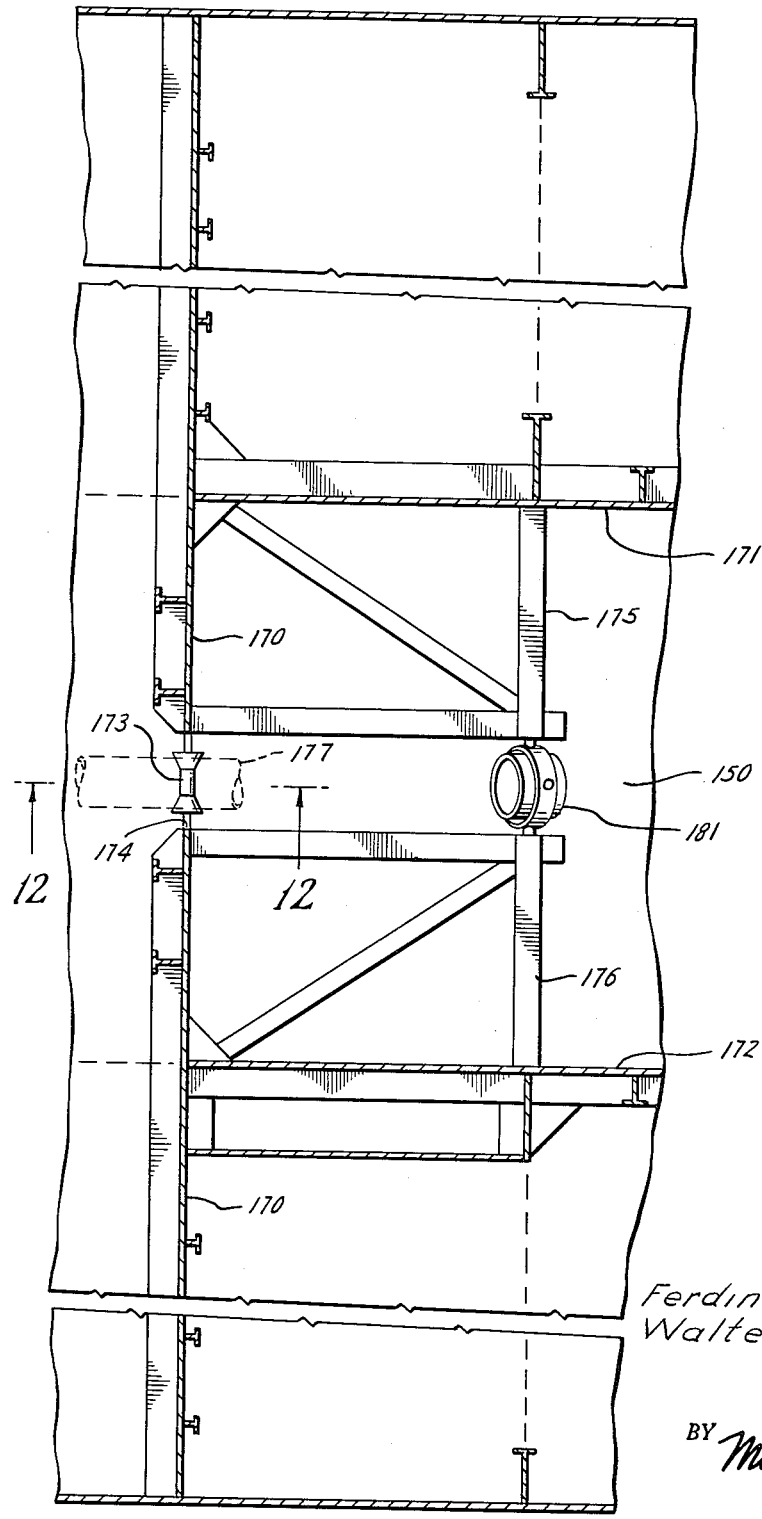
Figure 11 is a horizontal section taken on line 11—11 of Figure 3.

Referring first to Figures 1, 3 and 4, there is shown a line burying apparatus comprising a vessel 50 floating in a body of water 51. The vessel is provided with winches 52, 53 and 54 at its leading end and 55, 56 and 57 at its trailing end, driven respectively by engines 58 and 59. Winches 52 and 54 are used to wind up cables 60 and 61 connected at their remote ends to leading anchors (not shown), and winch 57 is used to wind up cables 62 and 63 connected at their remote ends to trailing anchors (not shown). The winches are all provided with brakes and drags such as that indicated at 64 on winch 57. The vessel can be moved forward at regulated speed by winding up the cables of the leading anchors while allowing the cables of the trailing anchors to unwind under tension. Whenever the vessel gets too close to the leading anchors and too far from the trailing anchors, the anchors can be raised and relocated by means of a small boat, the vessel being anchored in the meantime by other suitable means such as the spuds hereinafter described. The reverse procedure can be used for backward motion of the vessel. Alternatively the vessel can be continuously self propelled forwards and backwards by means of a screw propeller or can be towed.

At both the leading and trailing ends of the vessel there is provided means to guide the vessel along a line such as the pipe 70 resting on the marine floor 71. At the leading end this guide means comprises a pair of pipes 72, 73 axially slidably connected to the vessel by means of upper and lower pairs of gates 74, 75, 76, 77. The guide pipes 72, 73 are connected together at 78 and 79 so the whole guide assembly can be raised and lowered by cable 80 which is wound on half of double winch 53. A similar guide means is provided at the trailing end of the vessel comprising guide pipes 81, 82, and four gates including gates 83, 84, the trailing guide assembly being connected to cable 85 wound on half of triple winch 56.

Telescopically disposed inside each of the leading and trailing guide pipes is a spud or pole type anchor as shown for example at 86, 87 in Figure 4, the dotted lines showing the spuds extended for anchoring the vessel. The spuds are raised and lowered inside the guides by means of cables 88, 89, respectively connected to the leading and trailing pairs of spuds by double slings as shown in Figure 4, for example, at 90, 91, whereby each pair of spuds is raised and lowered as a unit. Cables 88, 89 are each wound on a part of the double and triple winches 53, 56.

The vessel is provided with a gallows or hoisting framework at each end as shown as 92, 93. By these means the four sheaves or pulleys over which pass cables 80, 85, 88, 89, can be supported high enough to allow sufficient vertical travel of the guide pipe and spud assemblies to disengage them from the pipeline being buried. Three of these four sheaves are shown in Figures 3 and 4 at 94, 95, 96. The gallows also serve to support the upper pair of gates, at both the leading and trailing ends of the vessel, at a sufficient height to provide firm supports for the guide pipes which slide therethrough. The lower pair of gates at the leading end is supported directly upon the hull of the vessel while at the trailing end a supporting framework 98 is provided, the lower pair of gates at both ends of the vessel being close to the waterline 99.

In Figures 5 through 7 are shown the details of the guide pipe-stud assemblies, each of which comprises a pair of pipes 101, 102 rigidly connected together in spaced apart relation by suitable bracing 103, 104 at the top and bottom ends thereof. A roller 105 is revolvably supported just below bracing 104. An eye 106 for connection to the cable hoist is connected to the top of bracing 103. Slidably telescoped within the guide pipes are spuds or pole type anchors 107, 108. The lower end of each spud is provided with a pointed closure as shown best at 109 in Figure 7. The upper end of each spud is provided with an eye such as 110 shown in Figure 5 for connection to a cable hoist. Suitable means are provided for locking the spuds against axial movement in the guide pipes. For example, a pin 111 passing through a pair of holes in the spud near the top thereof and resting in a pair of depressions such as 112 in the top of the guide pipe. While the described lock relies on the spud weight to prevent upward motion, a more positive lock can be provided by passing a bolt through holes in the guide pipe as well as in the spud and screwing a nut tight on the bolt.

Referring to Figures 8 through 10, there are shown the details of the gates in which the guide pipes are slidably received. Each pair of gates comprises three horizontal plates 120, 121, 122 rigidly secured together in spaced apart relation by means of vertical webs 123, 124, 125, 126. Semicylindrical plates 127, 128 serve to give further support to the horizontal plates and serve also as the inner halves of the bearings to receive the guide pipes. At the open side of each of plates 127, 128 are disposed three semicircular horizontal plates such as 130, 131, 132 rigidly secured together in spaced apart relation by vertical plates 133, 134, 135. Semicylindrical plates 136, 137, serve to give further support to the horizontal plates and serve also as the outer halves of the bearings to receive the guide pipes. The two outer halves of the bearings are held in place relative to the two inner halves by removable vertical pins 141, 142, 143, 144 passing through holes in the horizontal plates. The gates may be opened by removing one of the pins at each bearing and swinging open the outer bearing half with the other pin serving as a hinge pintle. To allow the outer bearing halves to swing toward the center of the pair of gates, the horizontal plates supporting the inner bearing halves are relieved as shown at 145.

The guide pipes being slidably connected to the vessel at the gates and the spuds being slidably received within the guide pipes, as already described, the lower ends of the guide pipes or the spuds will remain footed at the marine floor despite up and down motion of the vessel caused by tides, currents, waves, or loading of the vessel, thus maintaining the position of the vessel above the line being buried. The spuds and guide pipes at the trailing end of the vessel (see Figure 3) are also able to drop into the trench behind the vessel, because of these slidable connections, to anchor the trailing end of the vessel. Since the guide pipes and spuds at the trailing end of the vessel must drop into the trench behind the vessel as the burying of the pipe progresses in order to keep the vessel properly positioned above the pipe, those guide pipes and spuds are preferably spaced apart a distance less than the lateral spacing of the outermost of the nozzles, to be described later.

Referring now to Figures 1, 2 and 3, the vessel is provided with a well 150 through which extends a so-called "stinger" 151 for making a trench in which the pipe line is buried. The stinger comprises a pair of fluid conduits such as jet pipe 152 and suction pipe 153. Jet pipe 152 is connected at one end to the discharge of jet pump 227 mounted on the upper deck of the vessel and driven by engine 154. The other end of the jet pipe 152 is connected to a jet head 155 comprising a plurality of jet discharge nozzles to be described more fully hereinafter.

Suction pipe 153 is connected at one end to the intake of suction pump 156 in the hold of the vessel driven by engine 157 on the upper deck. The other end of the suction pipe 153 is connected to a suction head 158 comprising a plurality of suction nozzles to be described more fully hereinafter.

The connections between the jet and suction pipes and the pumps is flexible so that the stinger can pivot at this point of connection to the vessel. By means of a bridle 160 connected to the jet-suction head end of the stinger and cable 161 the stinger can be raised and lowered in the well. The stinger is raised all the way up into the well when the apparatus is not operating to bury a pipe line, but when burying operations are being conducted the stinger is lowered until the head is over the pipeline. Cable 161 passes over a sheave 162 to a portion of triple winch 56.

To supply water to the jet pump it is provided with a suction pipe 162 going over the side of the vessel and extending below water. To dispose of the mixture of water and solids taken in by the suction pump it is provided with a discharge pipe 163 extending over one side of the vessel.

Referring now to Figures 11–14 there is shown to a larger scale the stinger and its connection with the vessel. Figure 11 shows the leading end of the well 150 which comprises transverse bulkhead 170 and longitudinal bulkheads 171, 172. A twin cone roller support 173 is disposed at the bottom of slot 174 in bulkhead 170 to support the inlet pipe of the suction pump. Frames 175, 176 extend from bulkheads 171, 172 to provide a pivotal support for the end of the stinger adjacent the flexible connection of the stinger to the suction pump inlet pipe.

Figure 12:
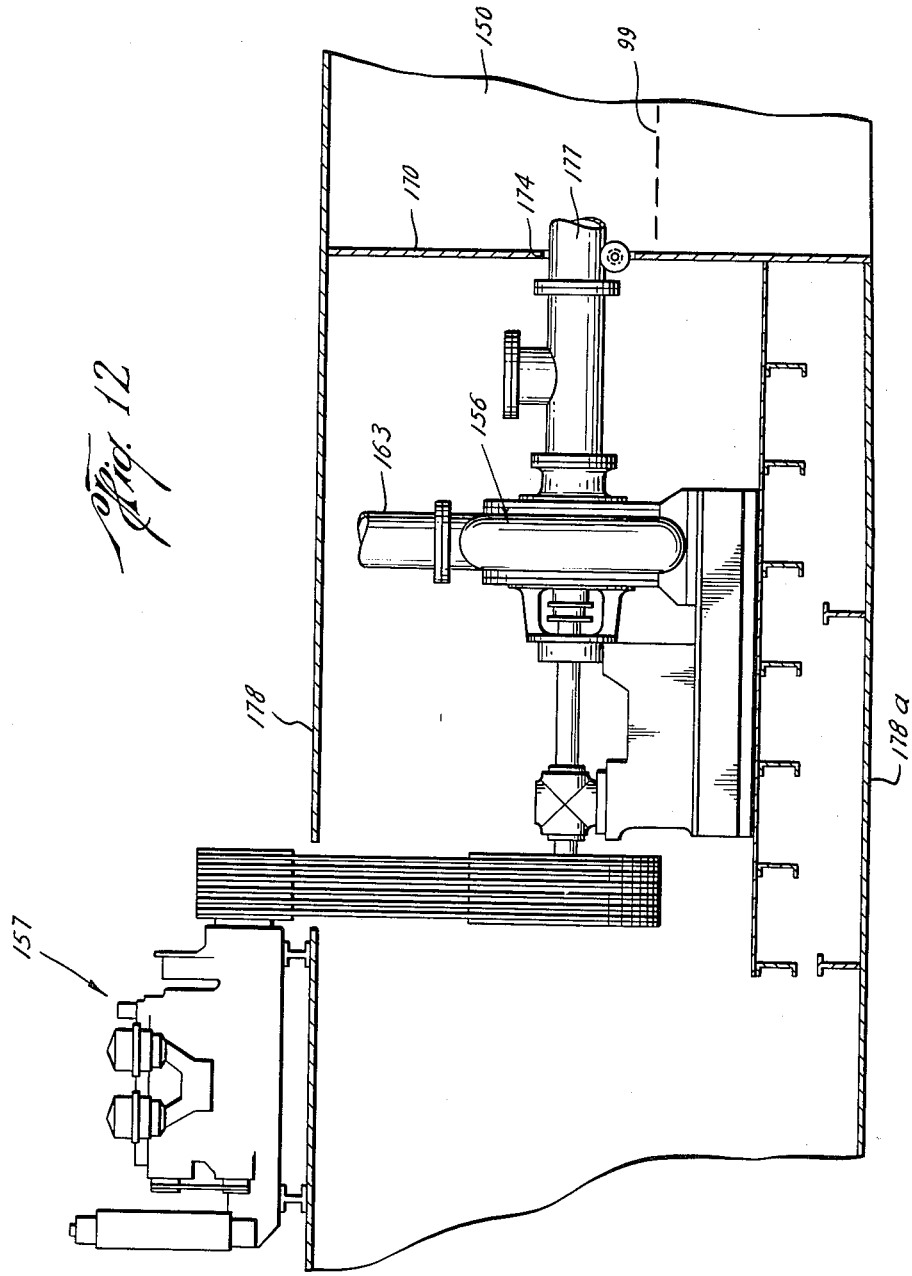
Figure 12 is a vertical section on the line 12—12 of Figure 11.

Referring to Figure 12, there is shown the suction pump 156 mounted just forward of bulkhead 170 with the suction pump inlet pipe 177 extending through the slot 174 in bulkhead 170. The suction pump is mounted midway between the bottom 178a of the vessel and top deck 178. The engine 157 driving the suction pump is mounted on deck 178.

Figure 13:
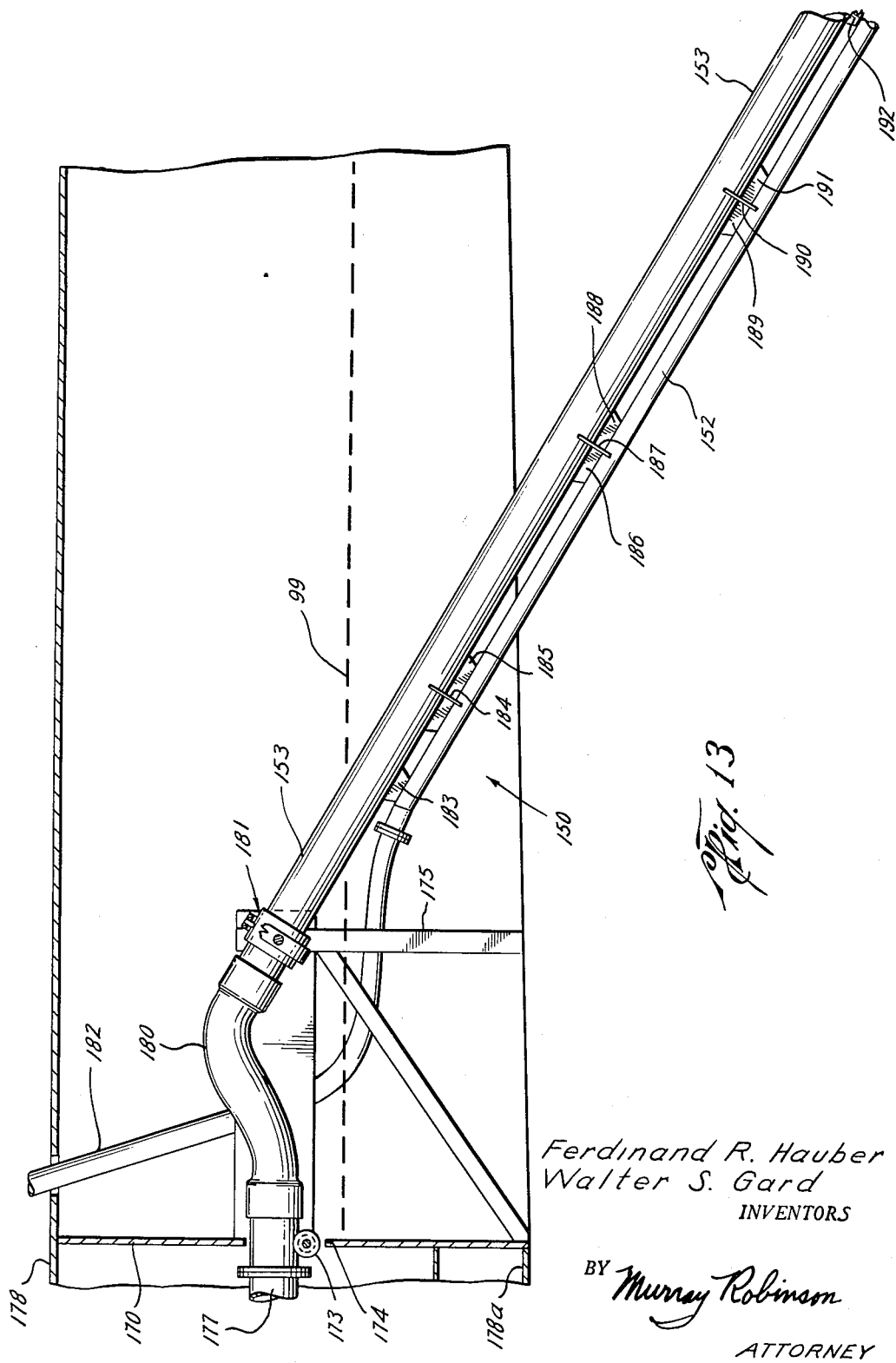
Figures 13 and 14 are continuations of Figure 12 progressing toward the right from Figure 12, showing the jet and suction flow lines and nozzles.

In Figure 13, there is shown suction pump inlet pipe 177 extending through bulkhead 170 into well 150 just above the waterline 99. A flexible hose 180 connects pipe 177 to the upper end of suction pipe 153. Gimbals 181 mounted between frames 175, 176 (Figure 11) doubly pivotally support the upstream end of the suction pipe so that the pipe can pivot freely in altitude and azimuth. A flexible hose 182 connects the jet pump outlet to the jet pipe 152. Longitudinal and transverse webs such as 183 to 192 connect the suction and jet pipes of the stinger into an integral unit.

In the position of the stinger shown, in which its head end is lowered for pipe burying operations, the central section of the stinger shown in Figure 13 extends beyond well 150 beneath the bottom 178a of the vessel.

Figure 14:
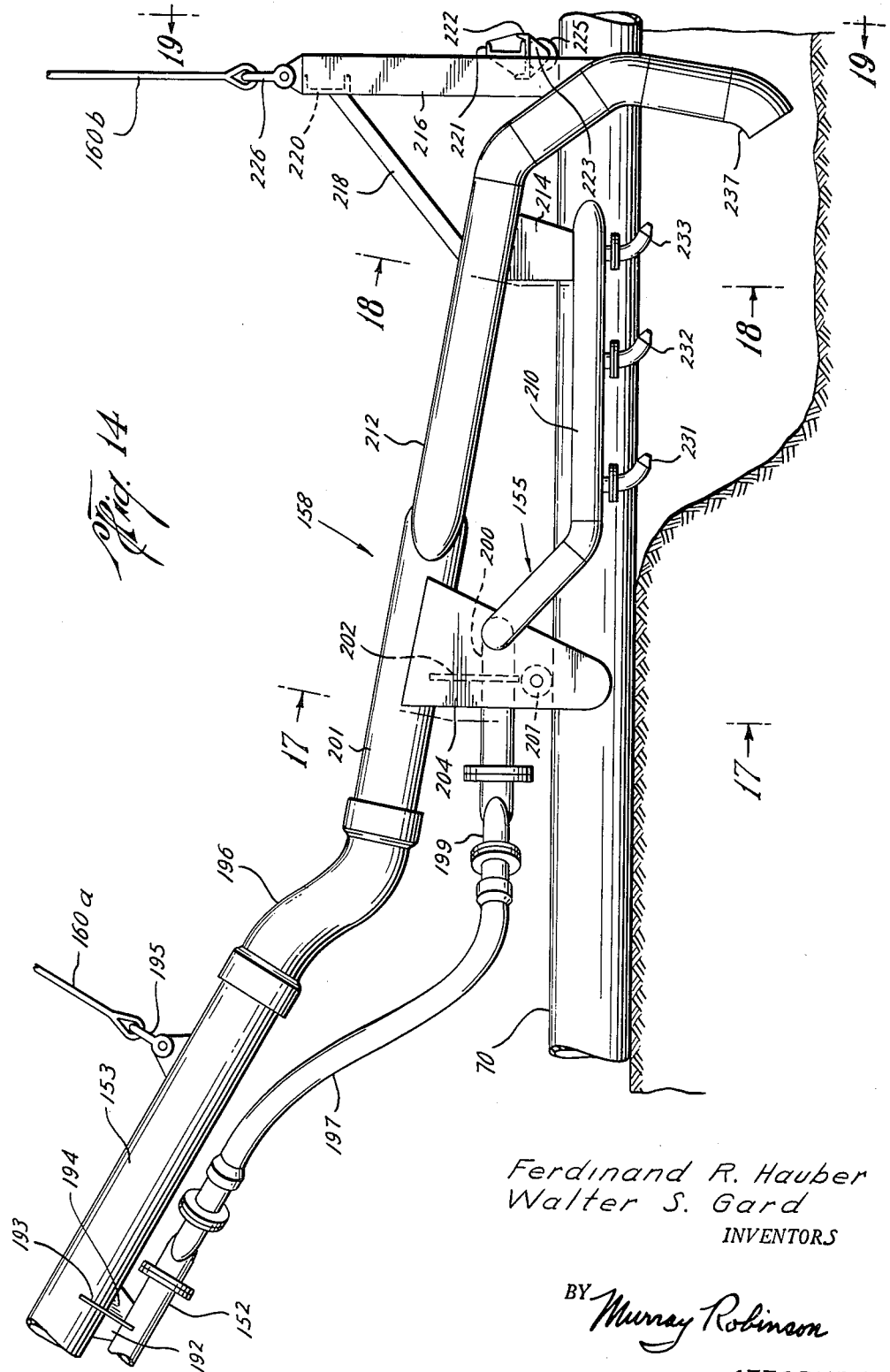

In Figure 14 is shown the head end of the stinger comprising the ends of suction and jet pipes 153, 152 held together by webs 192—194. The forward line 160A of bridle 160 is connected to suction pipe 153 by means of eye 195 pivotally connected to pipe 153. Suction pipe 153 is connected to suction head 158 by flexible hose 196. Jet pipe 152 is connected to jet head 155 by means of a pair of flexible hoses 197 and 198 (see also Figure 15) which if desired may be combined into a single hose but preferably are divided to reduce the bursting forces thereon due to the internal water pressure. If desired, a ball and socket joint may be substituted for hose 196 but a hose connection should preferably still be used for the connection to the jet head because of the high pressure.

Jet hoses 197 and 198 connect to a Y-pipe 199 which in turn is coupled to an oppositely positioned Y-pipe 200 forming the leading end of jet head 155. Suction hose 196 connects to a Y-pipe 201 forming the leading end of suction head 158. (See also Figures 15 and 16.) The Y-pipes 200, 201 of the two heads are rigidly connected together by transverse web 202 and longitudinal web 203 as best shown in Figure 17. Lateral webs 204, 205 and transverse pin 206 provide a support on which roller 207 revolves. By this means the leading end of the heads are supported on the pipe line 70 being buried.

Referring again to Figures 14–16, Y-pipe 200 of the jet head connects to two branch pipes 210, 211, and Y-pipe 201 of the suction head connects to two branch pipes 212, 213 (see also Figure 18). Pipes 210 and 212 on the one side and pipes 211 and 213 on the other are rigidly connected together by longitudinal webs 214, 215. A pair of vertical I-beams 216, 217 are connected to the tops of pipes 212, 213 and are braced by struts 218, 219. As best shown in Figure 19, beams 216, 217 are connected at their top ends by channel beam 220. Another channel beam 221 is bolted or otherwise releasably fastened to beams 216, 217 at any desired level. Beam 221 carries beneath it another channel beam 222. Vertical webs 223, 224 carried by beam 222 provide support for a rotatably mounted roller 225. By this means the after ends of the heads are supported on the pipe line 70. To the top of the rigid frame provided by beams and struts 216—221 are pivotally connected eyes 226 to which is fastened the after line 160B of bridle 160.

Figure 15:
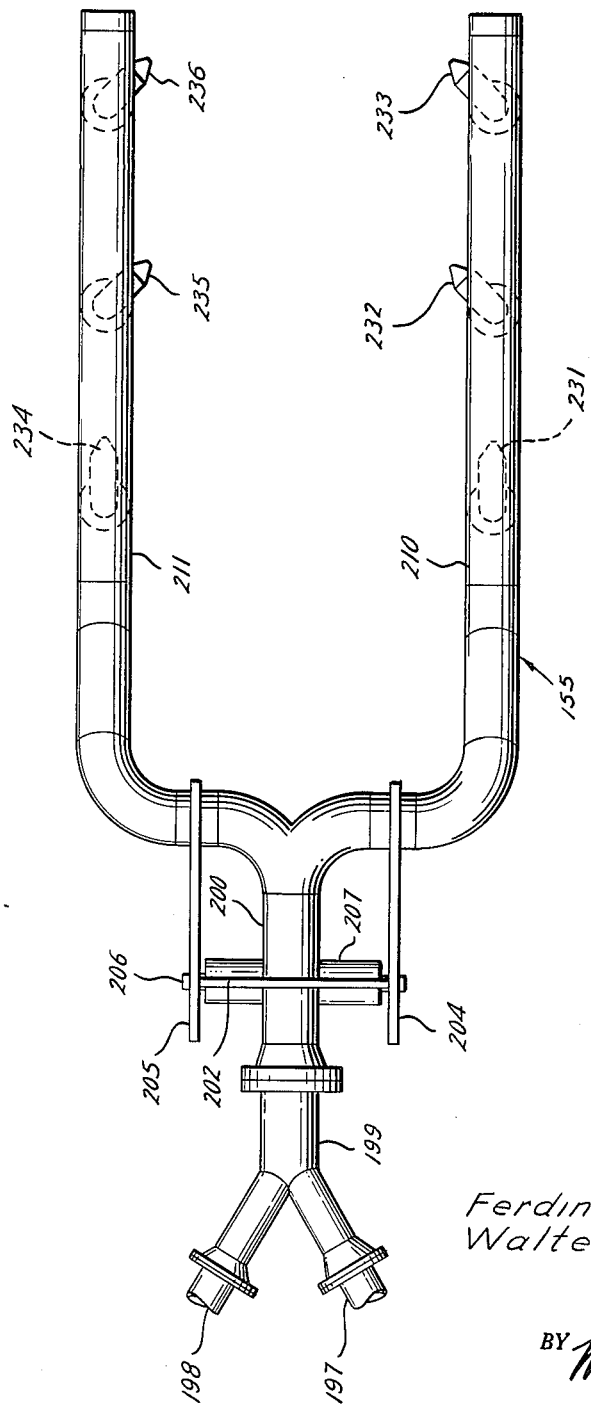
Figure 15 is a plan view of the jet headers, the suction headers being removed.

To the undersides of branch pipes 210, 211 of the jet head are connected a plurality of means for directing fluid from the lower ends of the branch pipes, preferably nozzles such as jet nozzles 231—236. As shown in Figure 20 each of the nozzles includes a coupling comprising flanges 237, 238 and bolts and nuts such as 239, 240 passing through openings such as 241, 242, by means of which the direction of the nozzle tip 243 can be adjusted relative to the nozzle base 244 that is welded to the pipe 210. As shown in Figure 15, the forward pair of jet nozzles 231, 234 are directed straight back while the other four jet nozzles 232, 233, 235 and 236 are directed inwardly at an angle of forty-five degrees relative to nozzles 231, 234. The forward jet nozzles cut parallel trenches at either side of the pipe line 70 into which move the remaining jet nozzles which cut underneath the pipe line. This is the preferred arrangement for use in soft formations. In hard formation, the forward pair of nozzles would preferably still be in the same azimuthal position, that is, parallel to the pipe line, but preferably would be directed straight down, a different nozzle being substituted to achieve this change. Also, in hard formations the other four nozzles would preferably be directed inwardly under the pipe line at an angle of ninety degrees to the pipe line and the forward nozzles.

The cuttings or washings from the jet nozzles are removed through fluid directing means such as the suction nozzles 237, 238 which have their mouths facing forward. The depth of the trench is controlled by rotating the heads about the roller 207 as an axis by raising or lowering the channel 221 on the vertical beams 216, 217.

Details of the gimbal mounting for the upstream end of the suction pipe 227 are shown in Figures 21–23. Vertical trunnions 220, 221 are secured to the suction pipe and pivot in bearings 222, 223, in frame 224. Horizontal trunnions 225, 226 are secured to the frame 224 and pivot in bearings in the frames 176, 175 (Figures 1 and 11). By virtue of the gimbal mounting of the upstream end of the suction pipe and by means of the flexible hoses connecting the jet and suction pipes with the pumps, the head end of the stinger can remain on the pipe line despite rise and fall and lurch of the vessel. No stress is transmitted from the vessel to the pipe line through the stinger. The cable 161 connected to bridle 160 is kept slack so that the stinger head will not be pulled up by the bridle when the vessel rises.

In like manner the cables 80 and 85 connected to the loading and trailing guide pipes are kept slack so that they will not be lifted off the pipes when the vessel rises and falls, and the sliding connections between the guide pipes and the vessel through the gates prevent any vertical stress being transmitted between the vessel and pipe line through the guide pipes when the vessel pitches. Only sidewise stresses are transmitted from the pipe line through the guide pipes to the vessel to maintain it in alignment with the pipe line.

For operation of the apparatus, the vessel is first placed over the pipe line and the guide pipes lowered onto the pipe line. Then the head end of the stinger is lowered onto the pipe line and the pumps started. Thereafter, as the earth is removed from beneath the pipe line the vessel is moved ahead and the pipe line to the rear drops into the trench. The action of the natural marine currents soon covers the pipe although if preferred the discharge from the suction pump can be used for this purpose.

While a preferred embodiment of the invention has shown and described, many modifications thereof can be made by one skilled in the art without departing from the spirit of the invention and it is intended to protect by Letters Patent all forms of the invention falling within the scope of the following claims:

We claim:

1. Submarine line burying apparatus comprising a floatable vessel having a leading and a trailing end, pressure pump means carried by said vessel to supply fluid under pressure, suction pump means carried by said vessel to withdraw fluid by suction, conduit means connected to each of said pressure and suction pump means and extending downwardly therefrom toward said trailing end of said vessel to respectively convey fluid under pressure therefrom and to convey fluid by suction thereto, fluid directing means connected to the trailing end of each of said conduit means, means to mount each of said fluid directing means on a line to be buried, one said fluid directing means being connected to said conduit means of said pressure pump means including jet nozzles disposed on opposite sides of the leading and trailing center line of that said fluid directing means to receive fluid under pressure therefrom, the other of said fluid directing means being connected to said conduit means of said suction pump means including suction nozzles to the trailing end of said jet nozzles and disposed on opposite sides of said center line of said one fluid directing means to convey fluid by suction thereto and opening below said jet nozzles on the underside of said line to be buried to withdraw materials loosened by fluid from said jet nozzles from beneath said line to be buried, said fluid conduit means comprising a pair of rigid pipes, means rigidly connecting said pipes together, double pivotal means connecting one end of said fluid conduit means to said vessel for pivotal motion about a horizontal axis transverse to the vessel and about an axis transverse to said pipes and lying in a vertical plane, flexible conduits connecting the upper end of one of said pipes to said pressure pump means and connecting the upper end of the other of said pipes to said suction pump means, and means including flexible conduits connecting the lower ends of said one pipe and said other pipe to said jet and suction nozzles respectively.

2. The combination of claim 1 in which said vessel has a well therein extending between said leading and trailing ends of said vessel, said double pivotal connecting means being disposed at the leading end of said well, and means connected to both of said fluid conduit means and both of said fluid directing means to raise them up into the well when desired.

3. The combination of claim 1 with means to guide said vessel along the line to be buried, said guide means comprising guide members extending down from said vessel and spaced apart at said leading and trailing ends of said vessel, means slidably connecting said guide members to said vessel for up and down motion of the lower ends thereof relative to said vessel and slidably connected means on the lower ends of said guide members to engage the line.

4. The combination of claim 3 in which the width of said means to engage the line on opposite sides thereof on the lower end of the guide member at the trailing end of the vessel is not larger than the distance between the outermost nozzles of said fluid directing means, whereby said line engaging means on said guide member can fit in the trench cut by said fluid directing means and continue to engage the line being buried as it falls into the trench created beneath said nozzles.

5. The combination of claim 3 in which said vessel guide means are pipes, and spuds slidably disposed in said pipes to anchor said vessel when desired.

6. The combination of claim 3 in which said guide members are releasably connected to said vessel.

7. Submarine line burying apparatus comprising a floatable vessel having a leading end and a trailing end, pressure pump means carried by said vessel, suction pump means carried by said vessel, a fluid conduit means connected to said pressure pump means to convey fluid under pressure therefrom, a fluid conduit means connected to said suction pump means to convey fluid by suction thereto, both of said conduit means extending downwardly and toward said trailing end of said vessel from said connections, a fluid directing means connected at the lower end of each said fluid conduit means, a single means to mount both said fluid directing means on a line to be buried, said fluid directing means at the lower end of said pressure pump-fluid conduit means including a plurality of jet nozzles disposed on one side of the leading-trailing center line of said fluid directing means and a plurality of jet nozzles disposed on the other side of said center line for receiving fluid under pressure from said pressure pump-fluid conduit means and having openings at the underside of the line to be buried to direct said fluid under pressure therebeneath, said other fluid directing means including suction nozzles disposed toward said trailing end of said vessel from said jet nozzles and disposed on opposite sides of said center line for conveying fluids by suction to said suction pump-fluid conduit means and having openings below said jet nozzles on the underside of the line to be buried to withdraw material from beneath the line to be buried loosened by said fluid under pressure from said jet nozzles, said means to mount both said fluid directing means on said line to be buried including a leading-end support, means connecting said leading-end support to both said fluid directing means, a trailing-end support, adjustable height means connecting said trailing-end support to both said fluid directing means, said adjustable height means having a range of adjustment extending from a position in which said jet nozzles open in a plane parallel to the line to be buried and said suction nozzles open at a level below said plane and a position in which said jet nozzles open in a plane inclined downwardly toward the trailing end with respect to the first said plane and said suction nozzles open below said level.

8. Submarine line burying apparatus comprising a floatable vessel having a leading end and a trailing end, a well opening through the bottom of said vessel and extending longitudinally thereof between said leading and trailing ends of said vessel, pressure pump means and suction pump means in said vessel adjacent the leading end of said well, means lowerable from the trailing end of said well for engaging a line to be buried beneath said vessel, a plurality of jet nozzle means supported on said line engaging means to either side of said line to be buried and opening below said line having a fluid conduit connection with said pressure pump means, at least two suction nozzle means disposed toward said trailing end of said vessel from said jet nozzle means and below said jet nozzle means and opening below said jet nozzle openings, said suction nozzle means also being supported on said line engaging means to either side of said line to be buried and having a fluid conduit connection with said suction pump means, said two fluid conduit connections each comprising an upper flexible connection to one of said pump means, a lower flexible connection to one of said nozzle means, and a central straight conduit section, whereby said jet and suction nozzles are lowerable with said line engaging means from the trailing end of said well to the line to be buried, whereby said jet nozzles direct fluid from said pressure pump means to below said line to be buried to loosen material therebelow, and whereby said suction nozzles direct fluid and said loosened material away from below said line to be buried.

9. The combination of claim 8 wherein said line engaging means includes a leading end support, an adjustable height trailing end support, both of said supports being connected to said jet and suction nozzles, said adjustable height trailing end support having a range of adjustment whereby said jet nozzle openings are positionable between the plane of the line to be buried and a plane inclined downwardly therefrom toward the trailing end of the vessel, said suction nozzles retaining their above named position with respect to said jet nozzles in all said positions.

References Cited in the file of this patent

UNITED STATES PATENTS

| | | |
|---|---|---|
| 508,766 | Sackett | Nov. 14, 1893 |
| 712,002 | Packard | Oct. 28, 1902 |
| 1,415,113 | Phillips | May 9, 1922 |
| 1,690,239 | Nicol | Nov. 6, 1928 |
| 2,061,440 | Schaefer | Nov. 17, 1936 |
| 2,602,300 | Collins | July 8, 1952 |
| 2,659,211 | Notarbartolo et al. | Nov. 17, 1953 |